Aug. 18, 1925.  1,549,868
C. C. GROTNES
MACHINE FOR EXPANDING BEADS IN CIRCULAR OBJECTS
Filed May 4, 1922  2 Sheets-Sheet 1
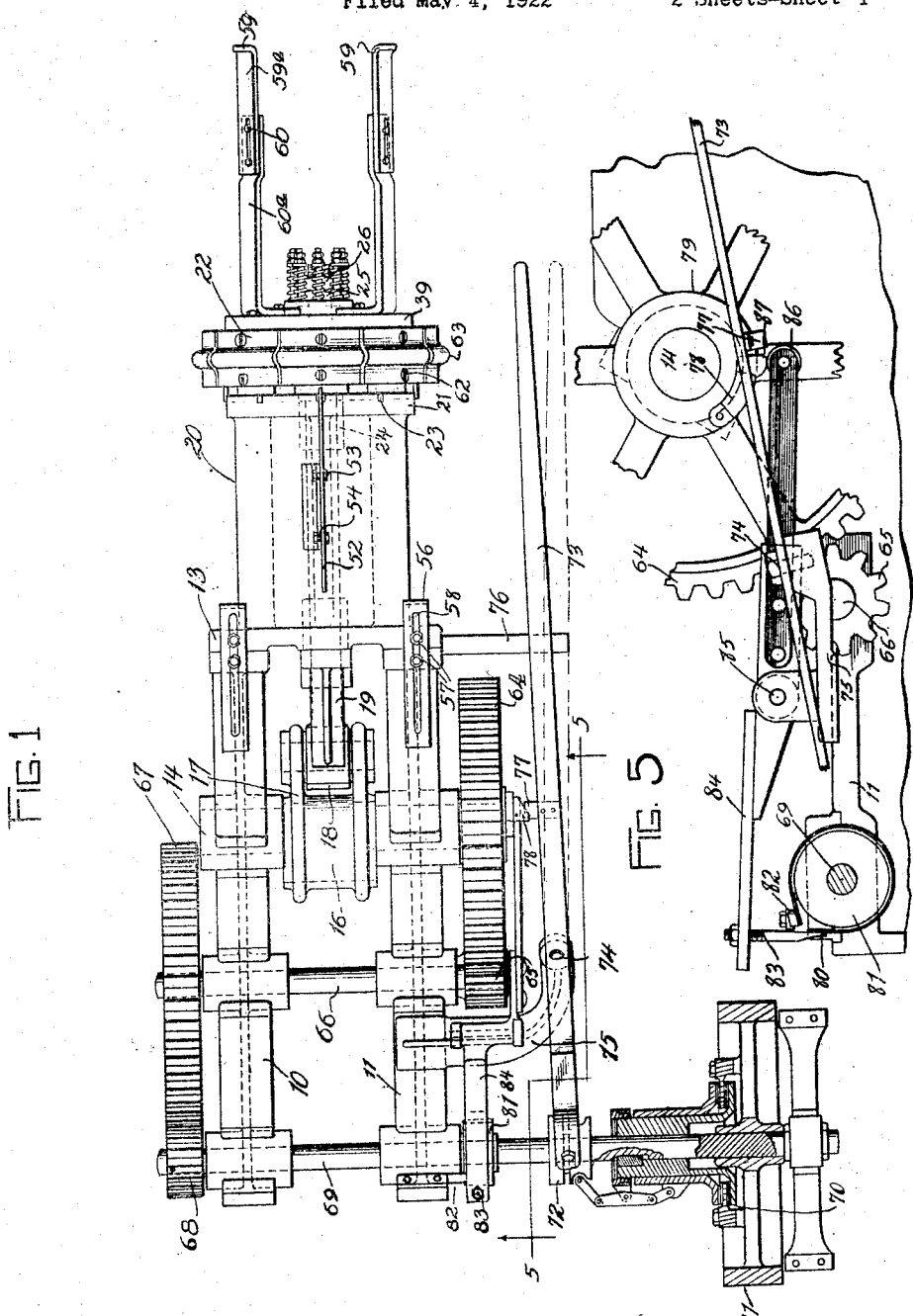
INVENTOR
CARL C. GROTNES.
By Crisdahl Parker Carlson
ATTYS.

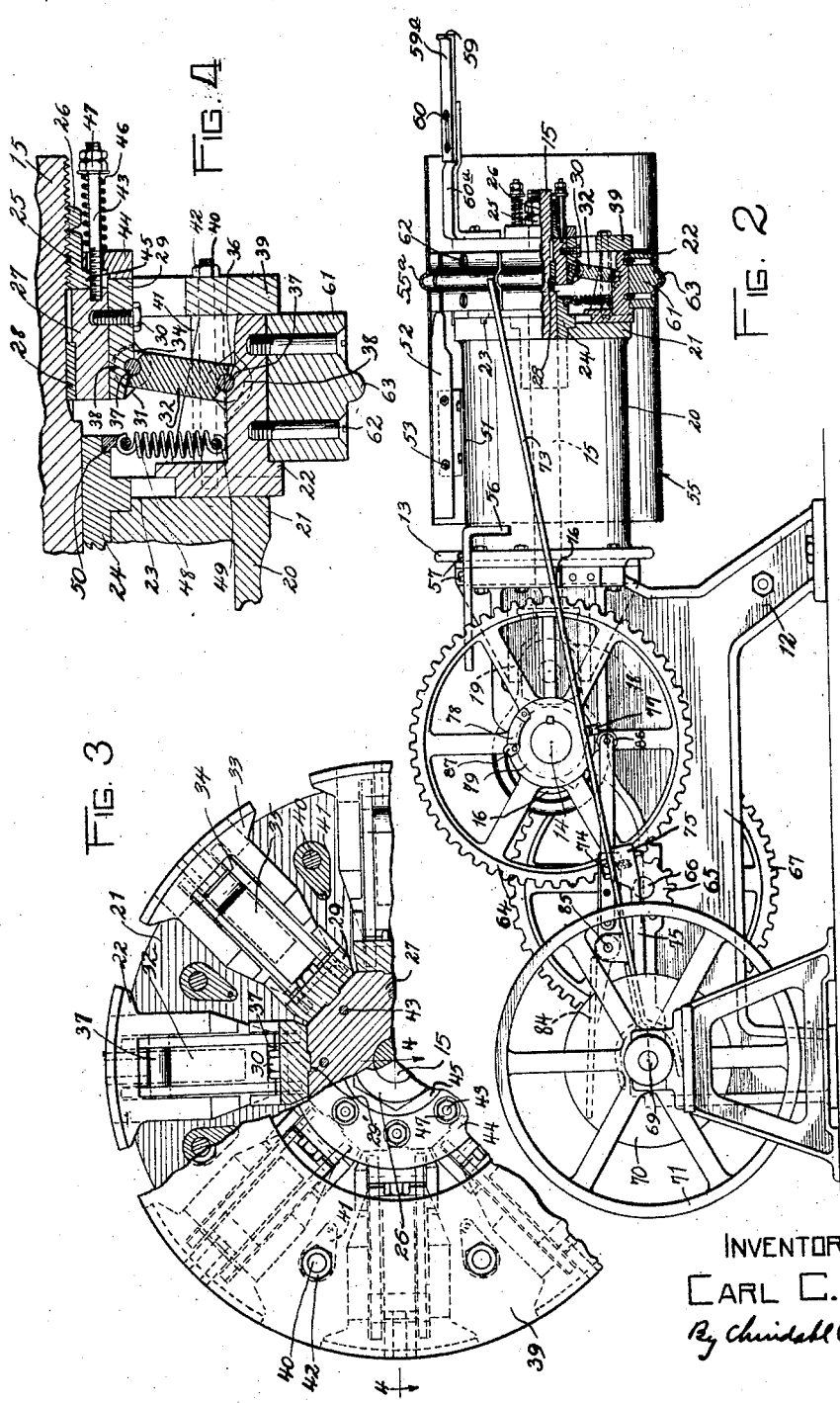

Patented Aug. 18, 1925.

1,549,868

UNITED STATES PATENT OFFICE.

CARL C. GROTNES, OF CHICAGO, ILLINOIS.

MACHINE FOR EXPANDING BEADS IN CIRCULAR OBJECTS.

Application filed May 4, 1922. Serial No. 558,416.

*To all whom it may concern:*

Be it known that I, CARL C. GROTNES, a citizen of the United States, residing at Chicago, in the county of Cook and State of Illinois, have invented a certain new and useful Machine for Expanding Beads in Circular Objects, of which the following is a specification.

This invention relates to expanding machines and particularly to a machine capable of expanding beads in and sizing up circular pieces such as rims and hoops and especially adapted for forming rolling or strengthening beads in the walls of steel drums or barrels.

One of the principal objects of the invention consists in providing an improved machine for expanding beads in circular objects which does not tend to weaken or injure the work in any way but instead leaves the same perfectly round and substantially stronger.

Another object of the invention is to provide a machine of this character embodying improved constructions and arrangements of parts for quickly and accurately forming beads adjacent opposite ends of the work, the machine having an automatic control for stopping the same after the completion of each expanding operation.

Another object is to provide a machine capable of ready adjustment for operating on various sizes of work.

The invention embraces other and ancillary objects and advantages which will be pointed out in the following specification. In the accompanying drawings Figure 1 is a plan view of the machine, parts thereof being shown in section for the purpose of better illustration; Fig. 2 is a side elevation; Fig. 3 is a fragmentary enlarged detail partly in section and partly in elevation of the expanding jaws and appurtenant operating mechanism, the die plates having been removed from the jaws; Fig. 4 is a fragmentary sectional detail taken on the line 4—4 of Fig. 3; and Fig. 5 is a fragmentary detail partly in elevation and partly in section taken on the line 5—5 of Fig. 1, showing the parts in the relative positions which they occupy at the end of a complete operation in which the jaws are made to expand and to contract again to their normal position.

Throughout the views the same reference numerals refer to the same parts.

Referring to the drawings, the machine comprises a frame composed of side members 10 and 11 having the usual legs 12 to rest upon the floor and fastened together by an end plate 13, which holds the side members in spaced parallel relation. Mounted in the frame is a driven crank shaft 14 for operating a drawbar 15. The crank shaft has a crank eccentric 16 arranged to transmit reciprocatory movement to the drawbar through a short bifurcated connecting rod 17. The latter has pivotal connection with a square block 18 on the end of the drawbar 15. The block 18 slides in parallel guides 19 projecting from the inner side of the plate 13. The plate 13 has extending outwardly from it a hollow cylindrical support 20, the outer end of which is formed to provide an annular plate 21 upon which a plurality of expanding jaws 22 are adapted to slide in radial guideways or slots 23.

The drawbar 15 projects through a bearing 24 (Figs. 2 and 4) at the center of the plate 21. The outer end of the drawbar is threaded to receive an adjusting center nut 25 and a lock nut 26. The nut 25 forms an abutment for a plunger head 27 splined to the drawbar 15 by means of a key 28 operating in registering keyways in the drawbar and plunger head, respectively, as shown in Fig. 4. The plunger head 27 has a plurality of plates 29 set in grooves 29' in the facets provided thereon (see Fig. 3). Each of the plates 29 is suitably secured by means of a cap screw 30 and has spaced projecting ears 31 between which is pivotally mounted a hardened steel toggle link 32 to provide connection with the expanding jaws 22. The toggle links 32 comprise connecting portions 34 and intermediate thrust bearing portions 35. The connecting portions 34 lie adjacent the ears 31 on the plates 29 and the ears 36 on the inner side of the jaws 22 and are suitably held by pivot pins 37. The intermediate thrust bearing portions 35 are cut away on opposite ends to permit pivotal movement of the links, as most clearly appears in Fig. 4. The ends of the thrust bearing portions 35 cooperate with bearing portions 38 between the ears 31 on the plates 29 and the jaws 22 to assume the load in the expanding movements of the jaws. The thrust bearing portions 35 of the toggles are arranged for free movement upon the pins 37 and provide a relatively large bearing surface with the complementary bearing portions 38 of the plates 29 and jaws 22 so that there is relatively little wearing of the pins by the toggle links.

The jaws 22 are movable between the annular plate 21 and an outboard support 39. The latter is supported from the plate 21 by means of studs 40 projecting through holes in spacing sleeves 41 and receiving nuts 42 to secure the outboard support rigidly upon the plate 21. The studs 40 and spacing sleeves 41 extend longitudinally in the spaces between the jaws 22 as shown in Fig. 3. The jaws being thus supported on one end by the plate 21 and at the other end by the support 39 move comparatively smoothly in the operation of the machine.

The plunger head 27 for the better operation of the machine and to compensate for wear in the toggles is adjustable longitudinally of the drawbar by means of the nut 25 so that at the innermost projection of the drawbar in operation, in which position the same is illustrated in the drawings, the toggle links 32 will arrive substantially at a dead center position as most clearly appears in Figs. 2 and 4. A very considerable and, in fact, the maximum outward pressure upon the jaws is thereby secured by a comparatively light pull communicated to the drawbar 15. The nut 25 provides with the plunger head a positive driving connection between the drawbar and the toggle links as regards inward movement of the drawbar in expanding the jaws.

In returning the jaws to contracted position, it is desirable to avoid positive movement of the plunger head in view of the fact that accidental blocking or jamming of the jaws may occur, especially where the operator is careless or inexperienced or may fail to make the proper adjustment before referred to. A resilient lost motion operating connection is therefore provided which will permit the jaws in an emergency to remain open until the operator will have removed the obstruction or made the proper adjustment. This connection comprises studs 43 projecting through openings in a ring 44 and engaging in internally screw-threaded holes in the plunger head 27. The ring 44 is limited against inward movement by a flange 45 on the nut 25, and has bearing upon it a plurality of compression springs 46 which are passed over the projecting ends of the studs 43 and are compressed by nuts 47 threaded on the outer ends of the studs 43. In this way the plunger head 27 is yieldingly urged toward the nut 25. A plurality of coiled tension springs 48 extend radially between the bearing 24 and the jaws 22 and are connected to the latter by pins 49 and to the bearing 24 by a ring 50. The springs 48 acting in line with the slots 23 in the plate 21 yieldingly retract the jaws to contracted position and also in the operation of the machine place a certain drag on the jaws which tends toward smooth action thereof. Similarly, the plunger head 27 is yieldingly retracted by the springs 46 acting longitudinally of the drawbar.

Mounted upon the top of the cylindrical support 20 is a bracket 51 to which is secured a rest 52 by means of bolts 53 passing through slots 54 in the bracket 51 to provide for radial adjustment of the rest for different sizes of drums or other work to be operated upon. A typical drum is illustrated at 55 as having had a bead 55ᵃ expanded therein. The drums are passed over the jaws 22 upon the rest 52 and are moved into engagement with limiting stops 56 which are mounted on the frame side members and arranged to be adjusted by means of bolts 57 passing through slots 58 provided therein. A second pair of stops 59 are provided on the opposite side of the jaws 22 by strips 59ᵃ secured by bolts 60 to brackets 60ᵃ fastened to the outboard support 39 in any suitable manner. The bolts 60 permit adjustment of the stops 59 upon movement in the slots wherein they are entered and the foot of each of the brackets 60ᵃ engaging the outboard support may, if desired, be arranged for radial adjustment with respect to the drawbar to provide for operation on different sizes of drums.

The expanding jaws have die plates 61 fastened by means of screws 62 upon the outer faces thereof. These plates are arcuate in form and are preferably produced by cutting into sections a cast iron ring machined to the proper size and form on the inside and outside. The plates 61 preferably have rib-like projections 63 thereon which are adapted to lie in contiguous relation to the rib-like projections of adjacent jaws to form in effect a continuous annular rib which in the expansion of the jaws is arranged to form an annular bead in the drum 55. I have found that the metal of the drum will be accurately conformed to the contour of the die plates without the use of additional forms on the outside of the drum and that the metal composing the beads is virtually drawn from each end of the drum. The drum is thus in no wise weakened but is left perfectly round and substantially stronger. The die plates are readily replaceable by other plates the faces of which are provided with different projections as, for example, where embossing of a different kind is contemplated, or plates of different thicknesses may be provided so that the machine may be used to operate on drums of different sizes. The construction, furthermore, permits of the easy renewal when the die plates become worn from constant use. It will be apparent that the stops 56 and 59 may be so adjusted relatively to the jaws that beads may be formed at equal distances from opposite ends of the drum. When a bead is being formed adjacent one end, the drum may be placed in engagement with the stops 56 while supported on the rest 52. In forming the bead adjacent the opposite end the drum may be moved on the rest 52 and placed in engagement with the stops 59 and supported by the brackets 60ª. The rest 52 and the brackets 60ª having the stops 59 are preferably so related that the drum will be supported alike when in engagement with either of the stops.

In forming a bead in a steel drum it is necessary only that the crank shaft 14 be operated through a single turn to direct the jaws outwardly to expand the bead in the drum and thereupon to contract the jaws to initial position; and I have found that by using an eccentric on the shaft 14 in combination with a drawbar, whereby the expanding jaws 22 may be caused to move radially outwardly by a pulling as distinguished from a pushing force, the power may be more effectually applied to the work through the toggle links 32. The means for driving the crank shaft 14 preferably comprises reduction gearing including the spur gear 64 meshing with a pinion 65 on the shaft 66. On the opposite side of the frame the shaft 66 carries a spur gear 67 driven by a pinion 68 on the drive shaft 69. The latter is arranged to be driven through a clutch 70 from a continuously driven pulley 71. The plates of the clutch are shown in engagement in Fig. 1, being held in engagement by a clutch collar 72 operated by a control lever 73 pivoted at 74 upon a bracket 75 supported on the side member 11 of the machine frame. The lever 73 is arranged to be thrown manually from the dotted line position indicated and preferably is supported adjacent its free end upon a rest 76 projecting from the machine frame. The control lever 73 has projecting from it a throw-out finger 77 arranged to be engaged by a cam 78 mounted on the hub 79 of the spur gear 64. It will be apparent that the lever 73 may be operated manually to cause the operation of the machine and that upon the completion of a single revolution of the spur gear 64 with the driven crank shaft 14 the cam 78 engaging the finger 77 will disengage the clutch 70 to stop the machine.

In order to insure that the machine will come to an abrupt stop with the jaws in extreme contracted position, which position they occupy upon disengagement of the clutch, I prefer to provide braking means in the form of a brake band 80 operating on a brake pulley or drum 81 on the drive shaft 69. The one end of the brake band 80 is fastened to an arm 82 fixed upon the side member 11 of the frame, the other end of the band being adjustably secured to a stud 83 in the end of a rocker arm 84. The latter is pivoted at 85 preferably upon the bracket 75 which supports the clutch lever 73. The free end of the rocker arm 84 carries a roller 86 disposed adjacent the hub 79 of the spur gear 64. The cam 78 has an integral finger 87 projecting radially from the hub 79. As best appears in Fig. 5 the finger 87 of the cam 78 is angularly displaced slightly with respect to the nose of the cam 78 so that the disengagement of the clutch 70 will occur a slight interval before the finger 87 comes into engagement with the roller 86. Upon such engagement the arm 84 is rocked thus tensioning the band 80 on the drum 81 to effect the sudden stoppage of the machine.

The operation of the machine has been more or less fully described in the progress of the foregoing specification and requires little additional explanation. It is apparent that a drum to be beaded may be placed upon the support 20 over the expanding jaws and the end thereof will be properly spaced with respect to the jaws by the stops 56. The jaws at this time are of course fully contracted and preferably touch and may, if desired, be made with interlocking portions to interengage when the jaws close. The operator throws the lever 73 to the full line position shown in Fig. 1 to engage the clutch 70 whereby to drive the crank shaft 14 through the reduction or back gearing provided. The operation of the crank shaft effects the expansion of the jaws 22 through the medium of the plunger head 27 and toggle links 32 (see Fig. 4). In expanding the jaws move radially so that gaps are formed between adjacent jaws. These gaps, however, are so slight that the configuration of the work is hardly affected. However, if desired, the work may after one operation be turned slightly and expanded a second time. Upon the completion of a single revolution of the crank shaft the jaws will have been expanded and again contracted and will have formed a bead in the wall of the drum. At this moment the cam 78 operates to disengage the clutch 70 by engagement with the finger 77. Immediately thereupon the finger 87 by engagement with the roller 86 on the rocker arm 84 operates to effect braking action with the drum 81 to stop the machine. The drum may then be shifted on the support 20 toward the stops 59 and the operations before described may be repeated to produce another bead near the other end of the drum. As appears in Fig. 2 the drum in having the bead expanded therein shrinks slightly in length so that a slight clearance between the stops and the drum will be found after the bead is formed. This is attributable to the fact that the bead is formed of metal virtually drawn from the metal of the adjacent contiguous wall of the drum.

It will be apparent that while I have described a preferred embodiment of my invention the same is capable of considerable modification. I therefore in the appended claims endeavor to comprehend all legitimate modifications as defined within the spirit and scope of the invention.

I claim as my invention:

1. In a machine of the class described, the combination of a frame, a hollow cylindrical support carried by said frame, a plurality of expansible jaws mounted on one end of said support, an operating member reciprocable axially of said support and jaws and having operative connection with the latter to move the same, said support being adapted to receive a drum passed over said jaws arranged in the expansion of the jaws to have an impression produced on the inside thereof, a rest carried by said support adjustable in a radial plane to support drums of various sizes coaxially with said support, a stop longitudinally adjustable with respect to said support arranged to be engaged by one end of said drum upon movement thereof over said rest, said stop being adapted to insure the formation of the impression on the inside of said drum a predeterminable distance from the end thereof.

2. In a machine of the class described, the combination of a frame, a hollow cylindrical support carried by said frame, a plurality of expansible jaws mounted on one end of said support, an operating member reciprocable axially of said support and jaws and having operative connection with the latter to move the same, said support being adapted to receive a drum passed over said jaws arranged in the expansion of the jaws to have an impression produced on the inside thereof, a rest carried by said support adjustable in a radial plane to support drums of various sizes coaxially with said support, a stop for one end of said drum adjustable longitudinally with respect thereto to insure the formation of the impression on the inside of said drum a predeterminable distance from the one end thereof, a second stop on the opposite side of said jaws, arranged for engagement by the opposite end of said drum when moved away from said stop adapted to insure the formation of the impression on the inside of said drum a predeterminable distance from the corresponding end of said drum.

3. In a device of the class described, the combination of a plurality of outwardly movable jaws arranged in circular series, an operating member movable between said jaws having operative connection therewith to move the same, said jaws being adapted upon expansion within a drum to produce impressions on the inside wall thereof, and a pair of stops on opposite sides of said jaws adjustable longitudinally relative to the drum received by said jaws, said drum when placed in abutment with one of said stops being arranged to be impressed from the inside a predeterminable distance from the one end thereof, and when placed in abutment with the other of said stops to have a similar impression produced on the inside thereof a predeterminable distance from the other end thereof and in spaced relation to the first impression formed.

4. In a device of the class described, the combination of a plurality of outwardly movable jaws arranged in circular series, an operating member movable between said jaws and having operative connection therewith to move the same, said jaws being adapted upon expansion within a drum to produce impressions on the inside wall thereof, a rest adapted to support said drum in operative relation to said jaws, stops on opposite sides of said rest spaced longitudinally relative to said jaws and the drum received thereby, said drum being arranged to be placed on said rest in abutment with one of said stops to have an impression produced on the inside wall thereof a predetermined distance from the one end thereof and when placed in abutment with the other stop to have a similar impression produced on the inside thereof a predetermined distance from the other end thereof.

5. In a device of the class described, the combination of expanding jaws, positive means for transmitting power to said jaws to expand them, means having a resilient lost motion connection for transmitting power to said jaws to contract them to original position, and means having a resilient but direct connection with said jaws to facilitate contraction thereof.

6. In a device of the class described, the combination of outwardly movable jaws arranged in circular series, positively operated means reciprocable axially of said circular series of jaws and having operative connection therewith to move the same, means having resilient connection to move said last mentioned means longitudinally to retracted position, and means having resilient connection with said jaws to move the same inwardly to contracted position.

7. In a device of the class described, the combination of radially expansible jaws, longitudinally movable means having operative connection with said jaws to expand the same, means having resilient lost motion connection with said last mentioned means to move the same to retracted position, and radially active means having resilient connection with said jaws to contract the same.

8. In a device of the class described, the combination of a pair of spaced supports, jaws movable between said supports, one of said supports having guideways therein to receive said jaws, an operating member movable transversely to the path of movement of said jaws having operative connection therewith intermediate the ends thereof for moving the same, means operating from one end of the guideways in said support resiliently connected with said jaws for moving the same, and means for moving said operating member.

9. In a device of the class described, the combination with a plurality of expanding jaws arranged in circular series, of an operating member connected to said jaws and reciprocable axially of said circular series, means having positive connection with said member to move the same in one direction to expand said jaws, means having resilient connection therewith to return the same, and means having resilient connection with said jaws adapted to be tensed in the expansion of said jaws adapted to operate to return the same to contracted position.

10. In a device of the class described, the combination with a plurality of radially expanding jaws arranged in a circular series, of an operating member reciprocable axially of said circular series and having a toggle connection with said jaws to move the same radially outwardly, and means arranged approximately parallel with said toggle connection having resilient connection with said jaws for drawing the same radially to contracted position.

11. In a device of the class described, the combination of a plurality of radially movable jaws disposed in a circular series, a central bearing axially arranged relative to said jaws, a member reciprocable in said bearing, toggle links connecting said bearing with said jaws for expanding the same, and an annular member on said bearing having resilient connections with said jaws located approximately parallel to said links for retracting the jaws upon the withdrawal from expanding position of said operating member.

12. In a device of the class described, a circular series of outwardly movable jaws, a drawbar reciprocable axially of said circular series of jaws, and toggle links providing an operative connection between said drawbar and said jaws, said links comprising spaced connecting portions having pivotal connection by means of pins on said drawbar and said jaws and separate thrust bearing portions engaging said pins and held in position between said connecting portions.

13. In a device of the class described, the combination of a plurality of outwardly movable jaws arranged in a circular series, an operating member movable between said jaws and having operative connection therewith to move the same, and separable die plates mounted on the outer faces of said jaws having ribbed projections thereon adapted to lie substantially in contiguous relation with the ribs of adjacent plates on adjacent jaws in the circular series constituting substantially a continuous annular rib adapted upon expansion of said jaws on the inside of a drum to produce a bead thereon.

14. In a machine of the class described, a support, a member movable through the support axially thereof, a jaw slidable transversely upon the support, a bearing member mounted on the first-mentioned member so as to be adjustable longitudinally relative thereto, and a toggle link interposed between said bearing member and said jaw whereby movement imparted to the first-mentioned member will cause the jaw to move outwardly upon the support, said bearing member being adapted to yield with respect to the first member when the latter moves in a direction to cause the jaw to move inwardly.

15. In a machine of the class described, the combination of a base frame, a plate, means secured to one end of the frame and projecting a substantial distance outwardly therefrom and serving to support said plate, slide members mounted for radial movement relative to said plate, a plunger movable longitudinally through said projecting supporting means and operatively connected to said slide members, a driven shaft mounted on the base frame and operatively connected to said plunger, a drive shaft also mounted on the base frame parallel to the driven shaft and operatively connected thereto, said operative connection including a clutch on the drive shaft and a rotary member on the driven shaft, a clutch operating lever extending past said rotary member toward said plate, and means on the rotary member adapted upon the completion of one revolution thereof to actuate said lever to disengage the clutch.

16. In a machine of the class described, the combination of a base frame, a supporting member secured to one end of the frame and projecting horizontally a substantial distance outwardly therefrom, said supporting member having an opening extending longitudinally therethrough and at its outer end a pair of spaced annular members, a plurality of slide members mounted for radial movement betwen said annular members, a plunger movable longitudinally through said supporting member and said annular members and operatively connected to said slide members, a driven shaft mounted on the base frame and operatively connected to said plunger, and a drive shaft also mounted on the base frame and having a gearing connection with the driven shaft.

In testimony whereof, I have hereunto affixed my signature.

CARL C. GROTNES.